Figure 1:
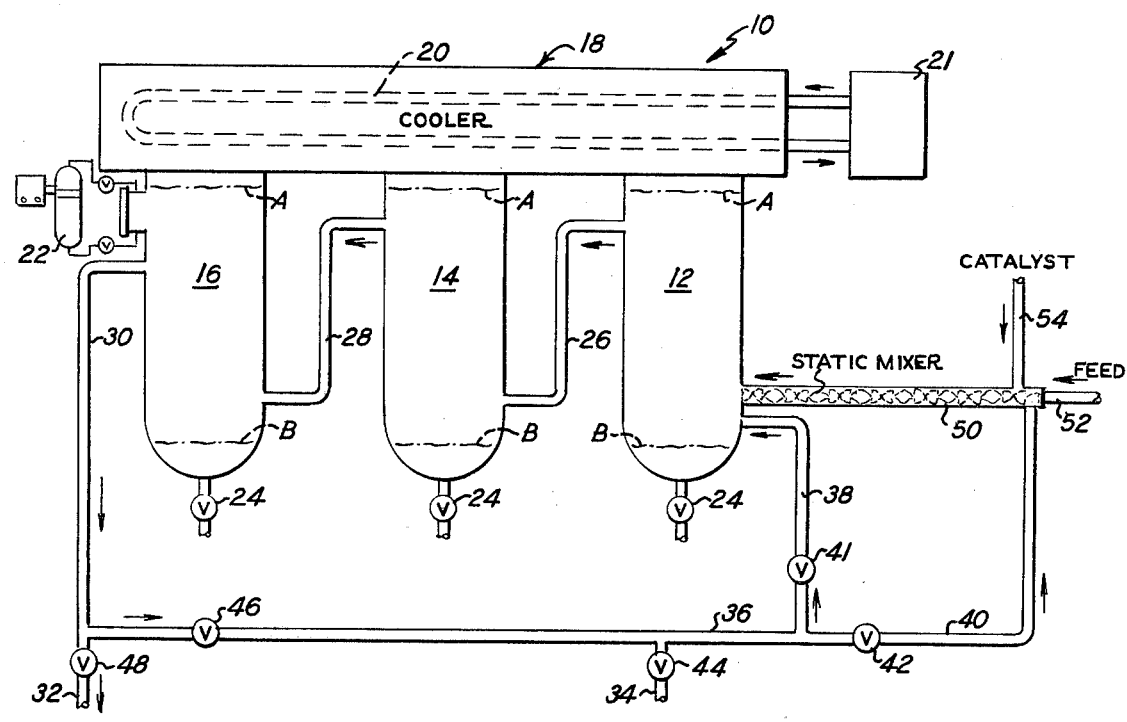

United States Patent [19]

Daniels

[11] 3,991,129
[45] Nov. 9, 1976

[54] PRODUCTION OF POLYBUTENE WITH STATIC MIXER

[75] Inventor: Calvin L Daniels, Big Spring, Tex.

[73] Assignee: Cosden Technology, Inc., Big Spring, Tex.

[22] Filed: Sept. 23, 1974

[21] Appl. No.: 508,658

[52] U.S. Cl. .................................. 260/683.15 B
[51] Int. Cl.² ........................................ C07C 3/18
[58] Field of Search ...................... 260/683.15 B

[56] References Cited
UNITED STATES PATENTS

| | | | |
|---|---|---|---|
| 2,508,744 | 5/1950 | Carlson et al. | 260/683.15 B |
| 2,521,939 | 9/1950 | Oriolo | 260/683.15 B |
| 2,528,876 | 11/1950 | Evering et al. | 260/683.15 B |
| 2,957,930 | 10/1960 | Jackson | 260/683.15 B |
| 3,119,884 | 1/1964 | Allen et al. | 260/683.15 B |

*Primary Examiner*—Paul M. Coughlan, Jr.

[57] ABSTRACT

Fresh feed of $C_1$-$C_5$ refinery gases containing predominantly polymerizable butenes are rapidly mixed and diluted with Friedel-Crafts catalyst and recycle reaction mixture in a static mixer before passing to the polymerization reaction column whereby the temperature is more readily controlled to a constant value to produce polybutene of more constant quality in higher yield and with less catalyst loss.

5 Claims, 2 Drawing Figures

PRODUCTION OF POLYBUTENE WITH STATIC MIXER

The present invention is an improvement over such prior patents owned by applicant's assignee as Jackson, U.S. Pat. No. 2,957,930 and Allen et al., U.S. Pat. No. 3,119,884, in which a liquified $C_1$–$C_5$ refinery gas mixed with anhydrous aluminum chloride, preferably promoted with hydrochloric acid or its water equivalent, is polymerized to form liquid polybutenes of low molecular weight, usually less than 8,000 and preferably in the range of 400 to 1500, characteristic of the product disclosed in said patents. The reaction is carried out in a reaction chamber maintained at a desired temperature usually in the range of $-40°$ F to about atmospheric, typically $+65°$ F, and at a pressure ranging from atmospheric up to about 150 p.s.i.g. The catalyst and feed together with continuous recycle are passed to the reaction chamber maintained at a selected constant temperature and pressure conditions in the stated ranges, and reaction product is withdrawn continuously from the recycle as described in said patents.

There is considerable variation in the character of the product formed by such reaction with variation in temperature particularly in the lower ranges, the molecular weight tending to be increased at the lower temperatures. As shown in Allen et al., since the reaction is largely exothermic, in order to produce a product in a selected low molecular weight range, the temperature of the reactor was attempted in this patent to be carefully controlled by supplying a good cooling control as the product passes through the reactor of novel design, moving through several legs of a multiple reactor, a common cooling by reflux being applied in each leg for optimum constant temperature control.

It is desirable in any case, to maintain a selected high concentration of catalyst in the reactor whereby the polymerization progresses smoothly and rapidly and by continuous recycling both catalyst and reaction medium through the reactor, the catalyst increasing by continuous feed, tends to build up to a selected desirable high concentration in the reactor. The fresh feed entering the system contains at least 3% of polymerizable $C_4$ hydrocarbon, typically isobutylene or n-butenes, or mixtures with n-butenes in variably large quantities, each of which are more rapidly polymerized and co-polymerized in contact with entering fresh highly promoted catalyst. Thus, the initial feed to the reactor of fresh liquified feed gas and catalyst with initial intermixture and before adequate distribution and dilution with the larger body of reaction mixture, tends to form an excessive quantity of catalyst sludge requiring frequent sludge removal. Moreover, with initially large exothermic heat release and wide temperature variation it also causes substantial variation in product quality, according to the process carried out such as shown by both Allen et al. and Jackson, both of these patents being here incorporated by reference.

According to the present invention, the feed mixture of dry liquified $C_1$–$C_5$ refinery gas includes a major portion of polymerizable $C_4$ olefines. Such gas often contains isobutylene present in quantity of at least 3% of the hydrocarbon mixture. It is statically mixed both with recycled hydrocarbon and catalyst reaction mixture as well as fresh catalyst and promoter being supplied whereby the incoming feed to the reactor is immediately well diluted by statically mixing before substantial exothermic reaction has taken place.

Such rapid dilution is accomplished by a static mixing in which these several components of the mixture are continuously divided in a tortuous spiralling path having division points in the path spaced at intervals of a few inches, each spiral portion of the path constraining the fluid to be helically rotated within a tubular housing as it moves spirally whereby the mixing takes place with spiralling radial flow as well as longitudinal flow. Such flow is caused to alternate in spiral direction at each division point, that is, the spiral direction is reversed from clockwise to counter clockwise. Moreover, at each division point the liquid mixture is divided, isolating each portion to move along opposite sides of the spiral. Such mixing takes place statically as a turbulent flow induced by merely pumping the several fluids through the static mixer. The net effect in merely flowing through a static mixer is an intensive mixing in the ducts by which the mixture is applied to the reactor, so that upon entry to the reactor the catalyst, feed supply and recycle are already intermixed with the catalyst, the composite being quickly directed to optimum reactive concentration avoiding high temperature and high concentration irregularities in that feed.

In that condition, tendency of the concentrated catalyst to react immediately with the high reactive olefine is greatly reduced, producing a considerable less quantity of sludge. Proportionately, the great release of heat by the highly promoted fresh catalyst exothermically to modify the character of the product through large variation in temperature is modified whereby the reaction is controlled more easily, even by the cooling method of Allen et al., to a very small heat variation for easier selective control. An overall result is much lower sludge formation and consequent higher yield in terms of quantity of catalyst supplied and smaller temperature variations within the limits of the normal temperature and supply controls. Finally, the overall yield of polymer from the same feed is significantly increased.

While the feed will contain at least 3% of polymerizable butenes, isobutylene, n-butenes or both, it can contain polymerizable $C_4$ olefines up to as high as about 75% of a liquified feed gas. The catalyst may be Friedel-Crafts catalyst but preferably is solid particles of aluminum chloride promoted with hydrochloric acid gas or its water equivalent. Such catalyst may be present in the feed passed into the static mixer in a ratio of about 1% to 3% of catalyst by weight of hydrocarbon in the mixer, but the catalyst ultimately will accumulate in the reactor and comprise between 10% to 20% of the total hydrocarbon in the reactor. For other types of reactors the flow rate is not critical. In the reactor shown by Jackson and Allen et al., the feed and catalyst rise in a vertical column and consequently since it is preferably aluminum chloride solids suspended in the liquified hydrocarbon, the selectd flow rate will be sufficient to maintain the catalyst particles suspended. For this purpose, the particle size of the catalyst will range from about 30 to 200 mesh U.S. standard screen, and the flow rate will be adjusted to exceed the catalyst settling rate by about 10% to 300%.

The fresh feed entering the reactor is mixed with recycle of the reactor mixture in a ratio of about 8 to 10 to 1 of recycle to fresh feed.

Figure 2:
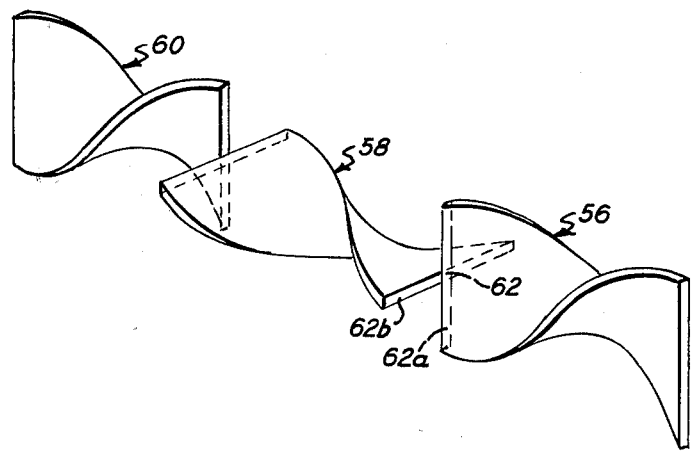

The invention is further described in relation to the drawings wherein:

FIG. 1 is a flow diagram showing a reactor having a static mixer before the first leg of the reactor; and FIG. 2 is a detail showing the characteristic features of construction of the static mixer.

Referring first to FIG. 1, reactor 10 consists of a column 12 comprising the first leg of the reactor, a second leg 14 and a third leg 16. Each of the column legs 12, 14 and 16 are open at the top and communicate with an overhead cooling system 18 in which is mounted a cooling coil 20. Cooling fluid is circulated through the cooling coil 20, refrigerated and supplied from a temperature control section 21 and may be as shown in more detailed construction in Allen et al. The reaction fluid in each of the legs 12, 14 and 16 is maintained at a selected height by a level controller 22, so that the liquified gaseous vapors evolves from each column and passes upward over the cooling coil 20 and is there condensed and returned as cooled reflux liquid to each reactor column leg. The liquid level thus being maintained at a point A of each leg by the controller 22.

Catalyst sludge accumulates in the bottom of each leg to a level B, and from time to time is blown down by opening of valves 24 for its removal.

The reaction mixture flows from the top of column 12 to the bottom of column 14 by way of a duct 26 and from the top of column 14 to the bottom of column 16 by way of a duct 28.

The reaction mixture is withdrawn from the column 16 by way of a duct 30 and is divided, a portion flowing through duct 32 for product recovery as shown in detail by Allen et al., and the spent liquid and catalyst suspended therein is returned to the reactor feed stream by way of ducts 34 and 36. Recycle liquid passing by way of duct 36 is divided, a portion returned by way of duct 38 directly to the reactor leg 12, and another portion, passing by way of duct 40, enters the static mixer 50 where it meets fresh feed and catalyst. The quantity of recycle flow in these several ducts are controlled by valves 41, 42, 44, 46 and 48. A controlled portion of recycle reaction mixture in duct 40 is mixed with fresh liquified refinery gas feed entering through duct 52 and with a supply of fresh catalyst slurry entering the mixer 50 by way of duct 54. Thus, fresh catalyst from duct 54, fresh feed of liquified reactable gas in duct 52 as well as recycle reaction mixture containing recycle catalyst in duct 40 are statically mixed in the mixer 50 and pass to the leg 12 of the reactor.

As shown in FIG. 2, the static mixer is formed of several mixing modules 56, 58 and 60, each of which are spiral vanes, each module usually spiralling in an opposite direction to control and impart mixing turbulence to the flow within the duct 52 in which each spiral vane is mounted, each vane usually extending diametrically to opposite duct walls, but each are separated at their juncture 62 by terminal edges. The edges are angularly disposed one to the next, one edge 62a being preferably disposed at a 90 degree angle to the terminal edge 62b of the adjoining spiral module. Moreover, it is preferred, but not essential, that the spiral direction of flow intercepted by the next succeeding module 58, taking its flow from module 56, directs the spiral from in a counter rotation with respect to the preceding module 56. Thus, where the direction of fluid flow spiral is counter clockwise as it passes through module 56 the fluid flow spiral of the module 58 will be clockwise, and the direction of spiral flow may again be reversed at the next succeeding module 60. These modules are static vanes and the composite of each module controlling a flow of a few inches such as anywhere from 2 to 12 inches, typically about 8 inches in a longitudinal flow for each module, produces in this spiral motion, not only intense turbulent mixing, but at each edge 62a and 62b, the fluid is divided at a 90° split and again divided at each terminal point of the several assembled modules. Thus, the flow although spiral preferably, is both completely reversed in spiral direction as well as split so that great turbulence and immediate temperature redistribution of the several components of the mixture as it develops exothermically, is effected. The ultimate velocity through the mixture is controlled by the flow of each feed component fit as well as the size passed to the mixer or diameter of the duct through which they pass as a supply feed to the lower leg 12 of the reactor. The total feed to the leg 12, however, is controlled by the total recycle and feed passing through ducts 38 and 40 controlled by valves 41 and 42.

In general, the total recycle passing through line 36 will vary in quantity from about 8 to 10 parts by volume of recycle fluid to one part of fresh feed and catalyst through lines 52 and 54. Fresh catalyst is supplied through duct 54 pumped as a liquid suspension in inert reaction product polybutene liquid, made up as a slurry of about 0.7 to 1.5 parts by weight of polybutene liquid, generally having the same low molecular weight as produced in the reactor, in the range of about 400 to 1500, to about one part of catalyst. The quantity ratio of catalyst solids to slurry is generally such as to merely form a pumpable slurry of catalyst suspended in such inert liquid, and the quantity of inert carrier liquid can vary non-critically for this purpose.

The quantity ratio of recycle reaction liquid together with fresh feed and catalyst is generally as stated above. The total flow of both recycle reaction liquid passing through line 38, statically mixed and directed as feed into the leg 12 of the reactor is adjusted to achieve a sufficiently high velocity through the mixer to maintain the catalyst suspended as a suspension of solid catalyst particles as in Allen et al., flowing from leg to leg at the selected velocity at a rate at least to exceed the tendency of the particles to settle from the suspension.

The catalyst per se, while it could be another Friedel-Crafts catalyst, is usually as stated in Allen et al., solid anhydrous aluminum chloride particles, ranging from about 0.1 to about 10 weight percent of catalyst based on the quantity of hydrocarbon in the mixer. The hydrochloric acid gas promoter will range from about 0.08 up to 10% by weight of hydrochloric acid gas based on the weight of the aluminum chloride. Aluminum chloride particles will generally be sized at the range of 30 to 200 mesh, U.S. standard screen whereby it is easily suspended in the flowing fluid.

The following example illustrates the practice of this invention:

EXAMPLE

90 Volume percent of a recycle liquid formed of this feed, 0.2 volume percent of catalyst slurry and 9.8 volume percent of a liquified refinery feed gas consisting of 55% butanes, 25% butenes and about 16% isobutylene, the balance of about 4% being other $C_1$–$C_5$ hydrocarbon gases, are passed together to the inlet of a static mixer 50 as shown in FIG. 1. The recycle is the reaction mixture, obtained from the third column leg 16 of the reactor of FIG. 1 and from which reaction product polybutene has been substantially separated as described by Allen et al. The recycle liquid contains about 15% by weight of suspended aluminum chloride particles and about 0.08% based on the aluminum chloride content, hydrochloric acid. The recycle liquid is divided into portions, the first portion passing through line 38 together with its suspended recycle catalyst therein is returned directly to the first leg 12 of the reactor. A second portion is mixed with the fresh feed liquid and catalyst slurry in the proportions stated, all entering the mixer 50 through lines 40, 52 and 54. Each of the components are sent through the static mixer 50 and are also simultaneously then supplied to the first leg 12 of the reactor column entering together with the recycle of line 38. The catalyst particles had an average size of about 65 mesh with settling rate of about 0.15 feet per second. The total feed through the reactor leg had an upward velocity of about 0.3 feet per second at a pressure on the system of about 22 p.s.i.g. The yield of relatively constant quality polybutene having a narrow range average molecular weight of about 770 to 785 and a viscosity of about 1000 ssu at 210° F producing in about 10% higher yield of polybutene recovered with about the same feeds as Jackson or Allen et al.

It is found operating with the static mixer that little temperature variation occurs overall, it being easily controlled within 5° plus or minus from a selected average 15° F degrees of temperature control, established in the reactor by cooling coil 20. This is in contrast to the normal operation of Allen et al. which will vary in continuous operation at least plus or minus 10°, and often greater. It is also found that the sludge accumulated at the bottom of each reactor 12, 14 and 16 was greatly decreased with respect to Allen et al. needing removal once every 4 to 8 hours, whereas before, sludge removal was commonly needed to be made in the Allen et al. reactor about every hour. The overall yield of polybutene having a molecular weight in the range of about 750 to 800 was produced with a yield increased by about 10% over Allen et al.

Consequently, the product was more standard, the process operated with less variation in temperature, the quantity of sludge and loss of catalyst was greatly reduced and the yield of product was increased as compared to a substantially similar operation without the static mixer.

Various modifications using this type of mixing for producing similar olefine polymers as known in the art may be applied here, using this preliminary mixing of feed, catalyst and recycle. The catalyst may be varied to use other known Friedel-Crafts type catalysts for this reaction. The temperature can be maintained selectively higher or lower for corresponding variation in the product. The size of the apparatus and throughput both through the reactor as well as the static mixer can be varied.

Accordingly, it is intended that the description given herein be regarded as exemplary and not limiting except as defined in the claims appended hereto.

I claim:

1. The method of polymerizing a $C_1$–$C_5$ liquified refinery gas mixture containing at least 3% of polymerizable $C_4$ olefine in continuous flow of said mixture through a reactor maintained at a selected temperature with a promoted aluminum chloride catalyst in suspension therein, the rapid cycle of reaction mixture including suspended catalyst, therein, comprising statically mixing a large diluting quantity of said cycle with the fresh feed of said liquified refinery gas mixture and fresh catalyst by passing said fresh feed, fresh catalyst and recycle through a continuously dividing and spiralling path, and passing said static mixture to the inlet of said reactor as a fresh feed mixture.

2. The method of continuously polymerizing $C_4$ olefine gases to form polybutene comprising passing a mixture of fresh liquified $C_1$–$C_5$ refinery feed gases, containing at least 3% of polymerizable $C_4$ olefine, promoted aluminum chloride catalyst slurry, and a large diluting quantity of recycle reaction mixture withdrawn from the reactor outlet, processed to remove reaction product, and then recycled to the reactor inlet, first to the inlet of a static mixer and intensively mixing said components in a continuously dividing and spiralling path to quickly mix, dilute and redistribute the components of said mixture to substantial homogenity and then passing said statically produced mixture to said reactor inlet.

3. The method as defined in claim 1 wherein the catalyst is a slurry of promoted aluminum chloride particles suspended in liquified polybutene reaction product.

4. The method as defined in claim 2 wherein the catalyst is a suspension of anhydrous aluminum chloride particles sized in the range of 30 to 200 mesh promoted with a small quantity of hydrochloric acid gas or its water equivalent, the reactor is a vertical reactor having its inlet near the bottom and the mixture is passed through said static mixer and then to the inlet of the reactor at a rate substantially exceeding the settling rate of said catalyst suspension in the reactor.

5. The method as defined in claim 2 wherein the $C_1$–$C_5$ feed stocks contain substantial quantities of isobutylene and n-butenes, and the temperature of the reactor is closely controlled in a narrow temperature range between −40° and +65° F.

* * * * *